United States Patent [19]

Galvagni et al.

[11] 3,711,843

[45] Jan. 16, 1973

[54] SELF-ADAPTING SYNCHRONIZATION SYSTEM FOR READING INFORMATION FROM A MOVING SUPPORT

[75] Inventors: Alighiero Galvagni, Ivrea; Mirco Raccanelli, Viverone; Vittorio Eccettuato, Cornaredo, all of Italy

[73] Assignee: Ing. C. Olivetti & C., S. p. A., Ivrea, Torino, Italy

[22] Filed: April 27, 1971

[21] Appl. No.: 137,795

[30] Foreign Application Priority Data

April 27, 1970 Italy ....................68429 A/70
April 16, 1971 Italy ....................68265 A/71

[52] U.S. Cl. ....................340/174.1 H
[51] Int. Cl. ....................G11b 5/04
[58] Field of Search ....................340/174.1 H, 174.1 A

[56] References Cited

UNITED STATES PATENTS

| | | | |
|---|---|---|---|
| 3,597,751 | 8/1971 | Heidecker | 340/174.1 H |
| 3,217,329 | 11/1965 | Gabor | 340/174.1 H |
| 3,404,391 | 10/1968 | Chur | 340/174.1 H |
| 3,581,297 | 5/1971 | Behr | 340/174.1 H |
| 3,395,355 | 7/1968 | Gabor | 340/174.1 H |

*Primary Examiner*—Vincent P. Canney
*Attorney*—Birch, Swindler, McKie & Beckett

[57] ABSTRACT

A self-adapting synchronization system is disclosed which synchronizes the reading of information from a moving support having data information interspersed with control information recorded thereon. The system includes a timing unit, which can be embodied either through an analog circuitry or through digital elements, and which is arranged under the control of the control information read from the support to adapt itself to variations in the speed of the support by generating timing signals the duration of which is proportional to the time interval between the two preceding items of control information.

5 Claims, 5 Drawing Figures

INVENTORS
ALIGHIERO GALVAGNI
MIRCO RACCANELLI
VITTORIO ACCETTUATO

*INVENTORS*
ALIGHIERO GALVAGNI
MIRCO RACCANELLI
VITTORIO ACCETTUATO

INVENTORS
ALIGHIERO GALVAGNI
MIRCO RACCANELLI
VITTORIO ACCETTUATO

SELF-ADAPTING SYNCHRONIZATION SYSTEM FOR READING INFORMATION FROM A MOVING SUPPORT

BACKGROUND OF THE INVENTION

The present invention relates to a self-adapting synchronization system for reading information from a moving support on which the information has been recorded. The support may be a magnetic tape or other magnetic record carrier. The invention operates with the type of support whereon control information is interspersed with data information. In synchronization systems it is known to discriminate between the control information and the data information under the control of a timing unit which is controlled in turn by the control information.

In supports for digital information, recognition of the information frequently relies on the space-time correlation between successive pieces of information. Some of these supports, for example magnetic supports, entrust the task of determining the spaces and the relative times in which the pieces of information are first written and then re-read to mechanical driving devices.

Since mechanical devices are subject to variations in speed due to various causes (for example, slipping, variations in voltage and frequency of the supply system, etc.), the spacing and the timing of the information are affected by a certain degree of error. On such error there are superimposed errors of detection on the part of the sensors which effect the reading.

The object of the present invention is to provide a self-adapting synchronization system which permits accurate interpretation of the information read on the moving support by widening the margins of error that the mechanical part driving the support itself is allowed.

There are basically two known solutions of this problem and they require, respectively, a fixed timing unit and a synchronized timing unit with a time constant, the latter being also known as a "blocked phase oscillator."

The first solution is the simpler and more direct one and consists of a monostable circuit with a strictly constant active phase time, which is caused to start from a piece of control information and which during the time in which it is active times the determination of the presence or absence of the following information. This system has the disadvantage of having a limited maximum working margin, within which each source of error (such as variations in speed, detection errors, calibration errors, etc.) has its full cumulative effect, the circuit being neither able to distinguish one effect from the other, nor to adapt itself thereto.

The second solution, the synchronized timing unit with a time constant, is more sophisticated and is applied, with special expedients, in "self-synchronizing" systems in which there is ensured a minimum amount of information supplied continuously for a certain time. It consists of a variable-frequency oscillator, the frequency of which is controlled, through a time constant, by the mean frequency of the control information, to which it is synchronized in phase. In this way, slow variations in speed with respect to the frequency of the control information, that is variations having a period which comprises at least about twenty of these pieces of control information, do not have any effect on the margins available for accommodating the other sources of information.

The disadvantages of this system are the need for a long preamble of known and constant information, this preamble being necessary for synchronizing the circuit and establishing the time constant at the correct value, and the criticalness of adaptation to sudden variations in speed, that is with periods of the order of about ten pieces of control information, which variations produce a reduction of the margin of error even greater than that which would be obtained with a fixed timing-unit system.

SUMMARY OF THE INVENTION

According to the present invention, there is provided a system for synchronizing the reading of information from a moving support having data information interspersed with control information recorded thereon, comprising a sensor for detecting the recorded information and a device responsive to the sensor to discriminate between the control and data information under the control of a timing unit which is controlled in turn by the control information, the timing unit being arranged to adapt itself to variations in the speed of the support by generating timing signals for the discriminating device the duration of which is proportional to the time interval between the two preceding items of control information.

In this system, the variations in speed and the detection errors are not distinguished and the sum of the two quantities is treated as if it were entirely variation in speed. This variation may, however, reach very great values since the margin of error is only reduced by the percentage amount of variation between one control information period and the next. Moreover, this system only requires the use of a preamble reduced to a single bit of information, provided it is known ("zero" or "one"), which enables the timing unit to be synchronized for reading the first useful piece of information at the actual speed of operation of the device driving the support.

This system is best applicable in apparatus with uncomplicated mechanical parts and in which the wider tolerance in performance thereby entails a substantial reduction of cost.

BRIEF DESCRIPTION OF THE DRAWINGS

The invention will be described in more detail, by way of two examples, with reference to the accompanying drawings, in which.

DESCRIPTION OF PREFERRED EMBODIMENTS

The invention is illustrated as applied to apparatus adapted to recognize the information written on a magnetic tape.

In the reading from a magnetic support, the movement of the magnetic support with respect to a head induces therein variations of flux in correspondence with recorded transitions of flux which are detected by means of known circuits and transformed into pulses. These pulses therefore have a timing which depends on the position of the transitions of flux on the magnetic support and on the speed with which the support passes below the reading head.

In cases in which a single recorded track must contain a sequence of bits of information of self-contained digital type, the recording techniques generally employed and which go by the names of phase modulation, frequency duplication, etc. utilize transitions of flux as information content and other transitions of flux for control purposes, these being interspersed with the first-mentioned in accordance with well-known schemes, in such manner as to be able to identify the presence of bits and at the same time attribute to them the value 0 or 1 in reading.

The system of discrimination in reading is therefore based on the possibility of distinguishing the information transitions from the control transitions as a function of the timing with which they present themselves to the head.

Figure 1A:
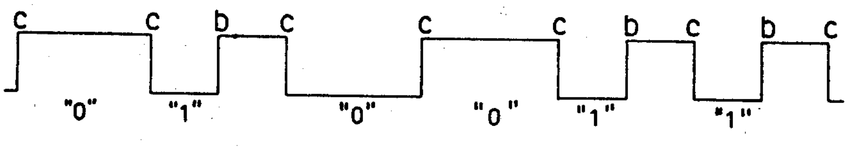
FIGS. 1a and 1b shown, respectively, a recording wave form and the preamble of information which precedes the useful information.
Figure 1B:
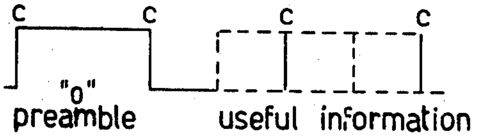
Figure 3:
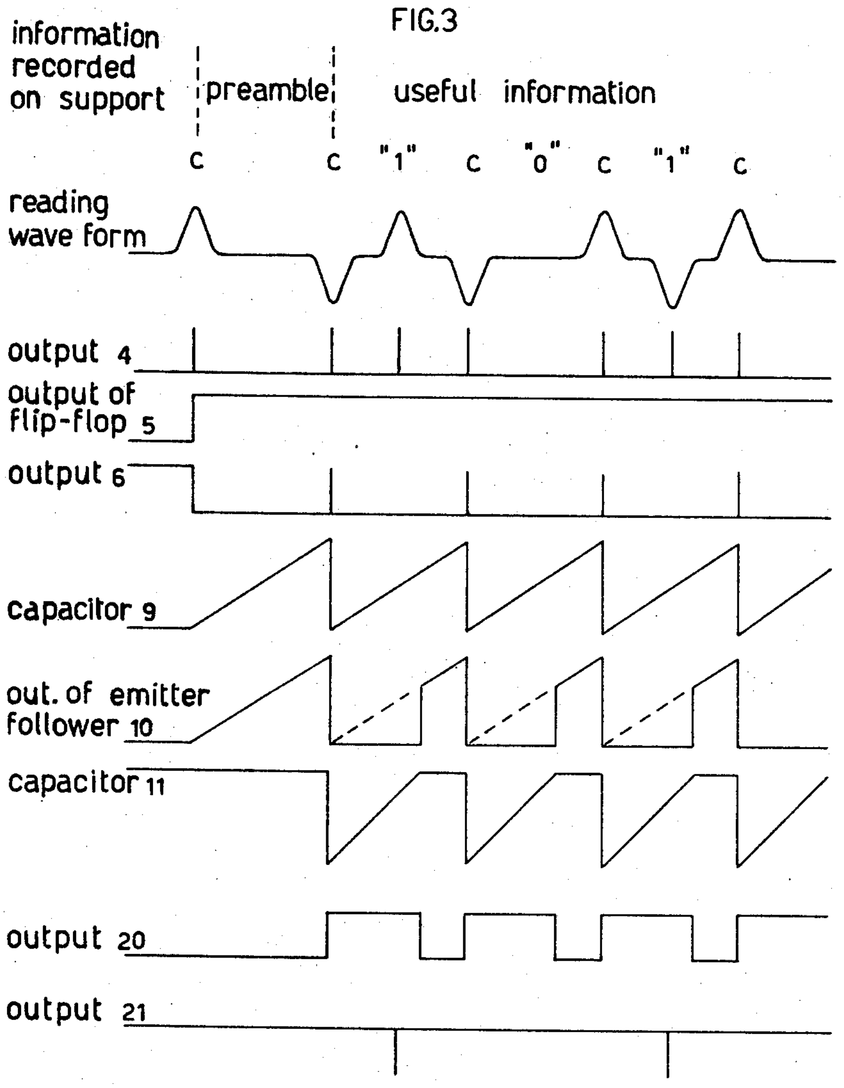
FIG. 3 illustrates the wave forms present in the apparatus according to FIG. 2.

Taking as an example FIG. 1, which shows a wave form for recording on a track by a frequency duplication recording method using symmetrical waveforms, it is necessary to distinguish the change-overs indicated by *b* (bits) from those indicated by *c* (timing), the change-overs *c* being present at each bit and the change-overs *b* being adjacent the change-overs *c* for those bits which are of 1 value.

The change-overs *b* are distinguished by utilizing the time parameter, that is by exploiting the fact that nominally their position is at half the distance from the nominal positions transitions *c*.

If, both during recording and during reading, a support moves at a non-constant speed, the distances and, therefore, the times which derive therefrom in reading are liable to vary in consequence. A second cause which induces the aforesaid distances to vary is that known as peak shift and this occurs when the resolution of the magnetic support or the system or both is not sufficiently high with respect to the packing density of the flux transitions.

The present invention solves the problems of distinction or discrimination in the case where the support is moved with variations of speed with respect to the nominal speed, while the second cause is present only to a small degree compared with the variations of speed.

The system according to the invention may be employed in a first form of execution, by utilizing an analogic circuit which measures the length in time of the preceding cell and causes the starting at the beginning of the current cell of a univibrator the duration of which is proportional to the measurement carried out previously. This univibrator discriminates between the following transition *c* or *b*, while the aforesaid circuit carries out again the measurement of the current cell, thus having ready for the future cell a univibrator duration, this duration being proportional this time to the present cell, and so on.

Figure 2:
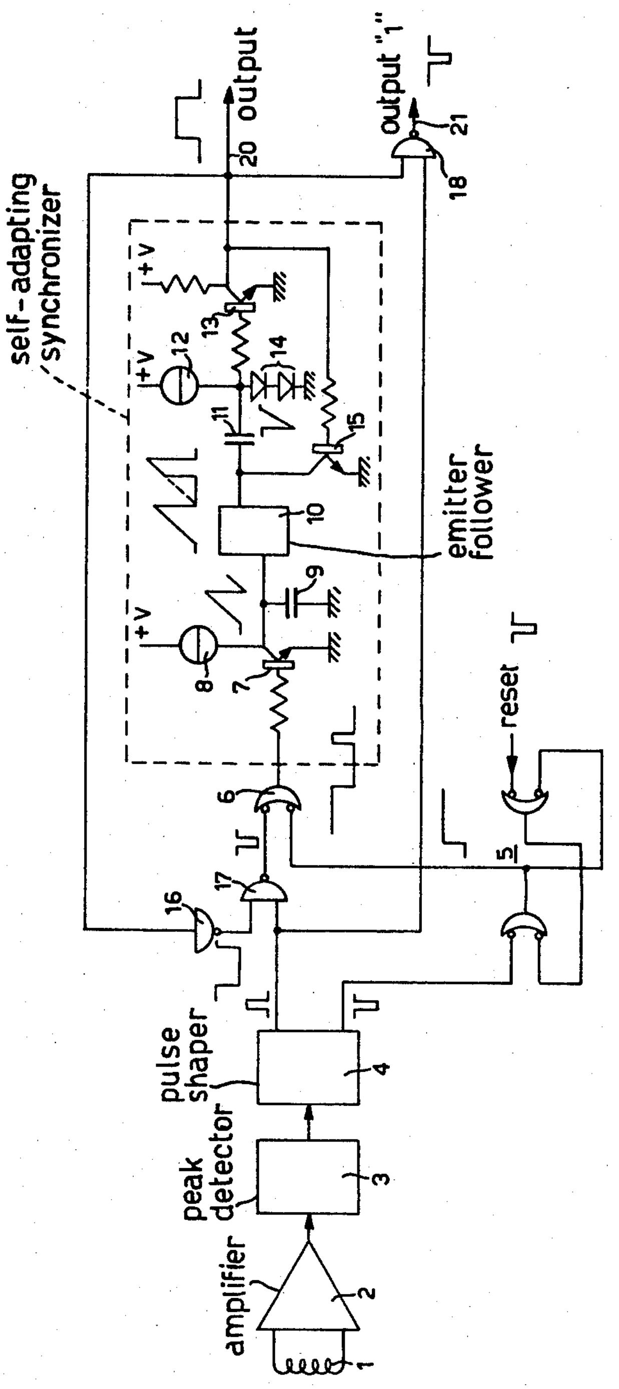
FIG. 2 is the diagram of a first form of execution of the apparatus embodying the invention.

Let it be assumed that a preamble is used which is constituted by a single piece or item of information 0 which precedes the useful information, as illustrated in FIG. 1, and that the apparatus which will be described with reference to FIG. 2 is employed for reading and detection.

The signal on the tape support is read by the magnetic head 1 which feeds the amplifier 2, from which the signal is applied to a peak detector 3. The detected signal is then brought to standard logical levels by a pulse shaper 4.

Under rest conditions, a flip-flop 5 is reset (by a preceding reset signal) and through the gate 6 keeps the transistor 7 saturated. In this condition, this transistor absorbs all the current produced by the current generator 8 and keeps the level of the capacitor 9 at zero. The output transistor 13 is also kept saturated by the current from the generator 12 and the transistor 15 is therefore blocked.

The first pulse to arrive, corresponding to the service information of the preamble, sets the flip-flop 5 to the "one" state, causing the blocking of the transistor 7. This transistor allows the current from the generator 8 to charge the capacitor 9. The ramp produced in this way is applied through a decoupling emitter follower 10 to a capacitor 11, which is charged to the same voltage. In this phase, changes of state do not occur in the final part of the apparatus.

The second pulse, corresponding to the control bit for the first useful bit, passing through the gates 17 and 6, saturates the transistor 7, causing the temporary discharge of the capacitor 9. The capacitor 11 also undergoes the same jump in voltage through the emitter follower 10, beinging the basic voltage of the transistor 13 to a negative blocking value; the output therefore rises, saturating the transistor 15. At this point, the current of the generator 12 begins to charge the capacitor 11, producing a slope which reaches the basic saturation value of the transistor 13 in a time equal to two thirds of the time between the two preceding pieces of service information (timings).

This happens inasmuch as the currents of the generators 8 and 12 are of equal value, and, moreover, the jump in voltage which is obtained at the capacitor 9 is proportional to the interval between the two preceding timing signals and the same jump is applied to the capacitor 11 which, having a capacitance equal to two thirds of that of the capacitor 9, is recharged in a time which is shorter in the same proportion.

During the time in which the capacitor 11 is recharged, the generator 8 also recharges the capacitor 9, but this slope is not applied to the capacitor 11 until the output becomes low again, blocking the transistor 15. The emitter follower 10 is thus enabled to bring the capacitor 11 rapidly to the voltage present at that instant at the capacitor 9.

A possible pulse caused by the presence of a 1 information is not applied to the base of the transistor 7 because the output 20 of the circuit, acting through the medium of an inverter 16, blocks the gate 17 throughout the time in which it remains high; during this time. The output 20 enables the gate 18, however, thus enabling the possible 1 information to arrive at the output 21 of the apparatus.

The following timing pulse then finds the way clear and, discharges the capacitor 9 to initiate a cycle like that already described.

According to a second embodiment of the invention, the analog circuitry of the first embodiment is replaced by digital elements. This digital arrangement can be used as a self-adapting synchronizer for various types of devices used for reading movable records (e.g. magnetic records).

The digital system can be made as sensitive as desired by simply decreasing the period of the internal counters; another advantage of this arrangement is that the internal counters can, in some situations, serve a plurality of other functions when not in use as a synchronizer, which fact allows for an overall cost saving.

Figure 4:
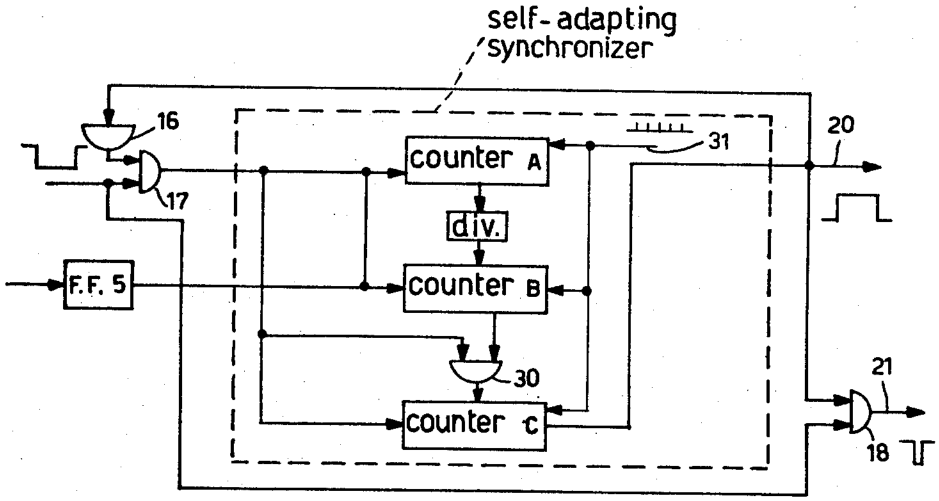
FIG. 4 is the diagram of a second form of execution of the apparatus embodying the invention.

FIG. 4 shows the digital self-adapting synchronizer which is used to replace the synchronizer of FIG. 2. Counters A, B and C, which have identical counting periods, are connected in the manner shown and are activated by line 31 which is connected to a pulse generator (not shown). A reset and start pulse is supplied through flip-flop 5 and causes counters A and B to begin to count in the forward direction; the pulses from line 30 have a frequency which is higher than the frequency of the pulses read from the moving record. Counters A and B count in synchronism since they both receive the same pulse train; however, a divider is connected between an output of counter A and the reverse count input of counter B. The divider supplies a backward count pulse to counter B for every predetermined number of forward pulses applied to the counters A and B. For example, for every four forward pulses one reverse pulse is supplied to the B counter. Pulse dividers are well known in the art and a number of commercially available dividers can be used for this purpose.

At the end of each reading interval, or cell (which produces a single information item from the moving record) counter A will register a number which represents the total duration of the interval while counter B registers a number which represents a fraction of this interval (the fraction being defined by the factor of the divider). This factor is constant throughout the reading operation.

When the next reading interval commences, a pulse, supplied through gate 17, resets counters A and B and allows them to start counting anew. This gate 17 pulse, which defines the beginning of an information cell, causes the contents B to be transferred to counter C through gate 30 just before the B counter is reset. Counter C is simultaneously enabled, by the gate 17 pulse, to count in the reverse direction so that, while counters A and B are counting forward during a given reading interval, counter C is counting in reverse, thereby reducing the count which counter B had registered at the termination of the prior reading interval. So long as the count in C is other than zero, a positive voltage is kept on line 20. This voltage is applied to gate 17, through inverter 16, causing gate 17 to be closed. A zero condition in counter C causes the activation of a switch connected to a voltage source (not shown) which causes the voltage on line line 20 to reverse, causing gate 17 to be opened. So long as a zero condition in counter C does not exist gate 18 is enabled producing a signal on line 21 which represents the information item and a pulse is produced on line 20 which is proportional to the previous reading interval. The analogy between the counter C and the capacitor 11 of the first embodiment is apparent; both have the function of applying to the cell currently being read the reading interval of the preceding cell.

We claim:

1. A system for synchronizing the reading of items of information from a moving support having data information interspersed with control information recorded thereon, comprising a sensor for detecting the recorded information, means responsive to said sensor for discriminating between the items of control information and the items of data information, and a timing unit which is controlled by said control information supplied by said discriminating device and controls in turn the same discriminating device, the timing unit being arranged to adapt itself to variations in the speed of the support by generating timing signals for the synchronization of the discriminating device, the interval between two timing signals being computed proportionally to the time interval between the two preceding items of control information read out from the support.

2. A system according to claim 1, wherein the timing unit comprises a first capacitor which is charged by a current generator during the interval between the successive items of control information, and a second capacitor which defines the duration of the timing signal for the information currently being read, the charging voltage reached by the first capacitor being transferred to the second capacitor at the instant when one of said items of control information is detected, so that the second capacitor defines the timing for the reading of the following information.

3. A system according to claim 1, characterized in that the timing unit comprises a first counter adapted to count forward during a first reading interval between two successive items of said control information, the count in said first counter thereby indicating the duration of said reading interval, a second counter adapted to count forward during portions of said first reading interval, and to count backwards in response to a signal from said first counter during other portions of said reading interval, the count in said second counter thereby indicating a fraction of the duration of said reading interval, and a third counter to which the contents of said second counter are transferred at the end of said first reading interval, said third counter counting backwards during a subsequent reading interval by a number of pulses which equals the count registered in said second counter at the end of said first reading interval.

4. The system according to claim 3, comprising divider means fed by said first counter for causing said second counter to count backward by each successive predetermined fraction of the number of counting steps which are counted by said first counter.

5. A system according to claim 1 wherein said moving support carries items of data information with each data information item being inserted between a pair of control information items, said moving support carrying further a single preliminary item of the control information which is adapted to initially synchronize the timing unit with the speed of the support.

* * * * *